Sept. 29, 1970        A. M. MOOS        3,531,327
METAL/AIR BATTERIES
Filed Feb. 8, 1967        2 Sheets-Sheet 1
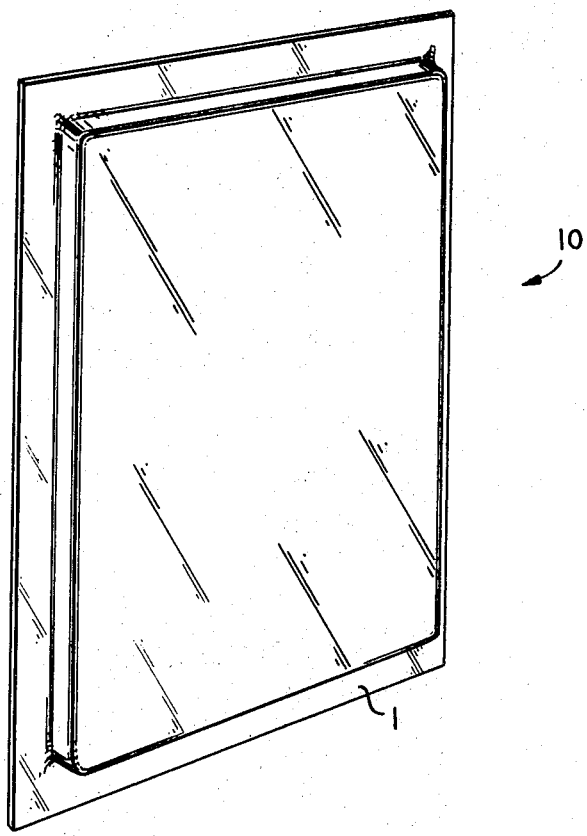
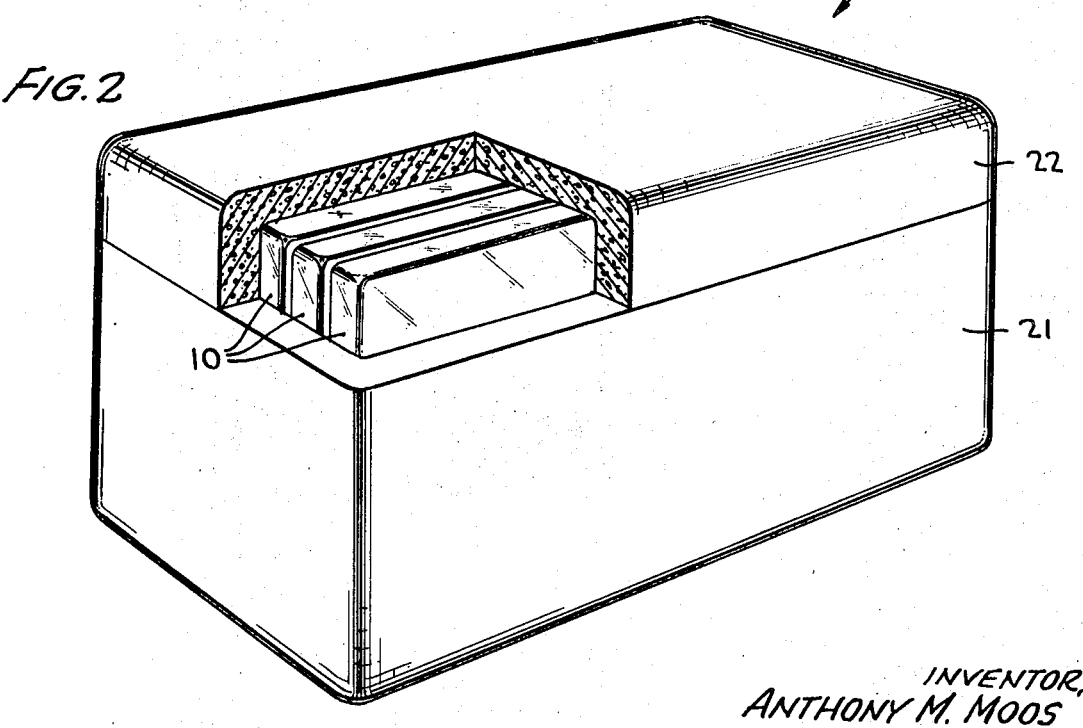
INVENTOR,
ANTHONY M. MOOS

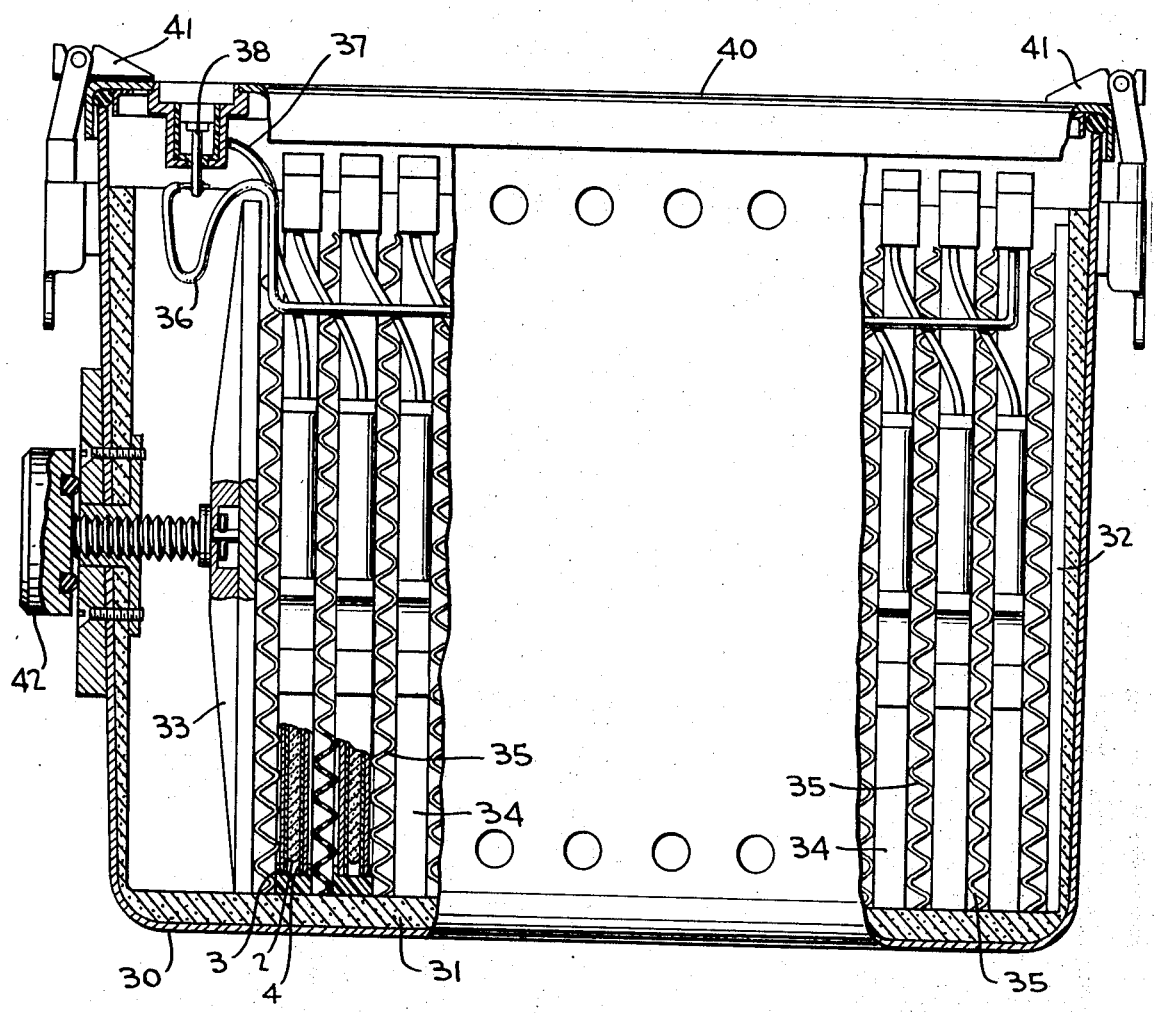

United States Patent Office 3,531,327
Patented Sept. 29, 1970

3,531,327
METAL/AIR BATTERIES
Anthony M. Moos, New York, N.Y., assignor to Leesona Corporation, Warwick, R.I., a corporation of Massachusetts
Filed Feb. 8, 1967, Ser. No. 614,684
Int. Cl. H01m 27/04, 29/04
U.S. Cl. 136—86      20 Claims

ABSTRACT OF THE DISCLOSURE

A liquid impermeable package containing a consumable metal anode and electrolyte for replenishing a mechanically rechargeable cell is described. A plurality (the number needed to recharge a complete battery) of the packaged anodes are stored and shipped in a protected compartment. Exceptional shelf life for the packaged fresh anodes is realized.

FIELD OF INVENTION

This invention relates to improved air or oxygen depolarized cells for the electrochemical generation of electrical current comprising a consumable anode and a non-consumable cathode separated by an electrolyte. The batteries employ replaceable metal anodes. More particularly, this invention embraces a package containing an activated anode and electrolyte in a liquid-impermeable container and a compartment containing a plurality of said packages for reactivating a complete air or oxygen depolarized battery.

BACKGROUND OF INVENTION AND PRIOR ART

Metal/air or metal/oxygen depolarized cells are described by Oswin in commonly assigned co-pending application Ser. No. 533,516, filed Mar. 11, 1966, which employ a non-consumable cathode, a consumable metal anode, and electrolyte. The cathode comprises a gas permeable, liquid-impermeable hydrophobic membrane in contact with an electro-catalyst. In the environment of the cell, the catalyst is in contact with the electrolyte and the membrane in contact with an air or oxygen suply. Preferably, an envelope cathode is employed permitting the insertion of the consumable anode directly into the cathode.

Cells of the above type are becoming increasingly attractive particularly from the standpoint of obtaining a high energy to density ratio and rapid discharge and recharge. The ability to obtain the high discharge rates and recharging is primarily a result of the novel and highly efficient cathodes. In order to recharge such cells in situ, however, it is necessary to have an available source of DC power. Particularly when the batteries are employed for propelling vehicles in the field, an external source of DC power is difficult, if not impossible, to obtain.

To overcome the aforesaid shortcoming, an air or oxygen depolarized cell having a replaceable anode permitting the mechanical replacement of the anode is disclosed in commonly assigned Oswin and Chodosh co-pending application Ser. No. 517,603, filed Dec. 30, 1965, now Pat. No. 3,436,270. Although such batteries have proven to be highly desirable, it was found that the need to replenish the electrolyte when replacing the anodes, particularly since the electrolyte is a corrosive material, was troublesome. Moreover, the transporting of the metal anodes, which are relatively fragile, presented problems.

OBJECTS AND BRIEF DESCRIPTION OF INVENTION

It is a primary object of the present invention to provide activated anodes for use in an air or oxygen depolarized cell which employ mechanically replaceable anodes.

It is another object of this invention to provide activated anodes and a fresh electrolyte supply for use in an air or oxygen depolarized cell which employs mechanically replaceable anodes.

It is still another object of this invention to provide a protected compartment of activated anodes for replacing the anodes of an air or oxygen depolarized battery.

These and other objects of the invention will become more readily apparent from the following detailed description with particular emphasis being placed on the drawing.

The aforesaid objects of the present invention are accomplished by packaging a porous anode impregnated with electrolyte, or packaging a porous or solid anode having a hydrophilic separator or matrix around the anode impregnated with electrolyte, in a liquid-impermeable bag. Thereafter, sufficient electrodes in a bag to "recharge" a complete battery are packaged together in a protected compartment. Accordingly, a discharge metal/air battery can be recharged by (1) removing and discarding the spent anodes; (2) removing the fresh or activated anodes from the protected compartment and individual bag; and (3) inserting the anode in the cathode. Since the cathode is non-consumable, it needs no attention and the electrolyte necessary for replenishing the cell is contained in or supplied with the anode. As apparent, the battery can be reactivated any place by an extremely simple operation without need of a DC or other power source. Furthermore, if desired, the spent anodes rather than being discarded can be packaged in the containers in which the fresh anodes were delivered and returned to a central location for external recharging or salvaging. The external recharging is described in commonly assigned co-pending Chodosh application Ser. No. 517,594, filed Dec. 30, 1965, now Pat. No. 3,457,488.

The improvements in the battery construction in accordance with the present invention will be more readily apparent from reference to the drawing wherein like numerals are employed throughout to designate like parts.

THE DRAWING

In the drawing:

FIG. 1 is a perspective view of an activated anode in a plastic bag;

FIG. 2 is a perspective view, partially cut-away, of a protected compartment containing a plurality of the anodes shown in FIG. 1; and FIG. 3 is a cut-away side view of a lightweight air or oxygen battery of the type employing replaceable anodes.

More specifically, FIG. 1 illustrates a package 10 comprising a plastic liquid-impermeable bag 1 containing the anode. FIG. 2 illustrates a plurality of bagged anodes 10 in a protected compartment 20 comprising a receptacle portion 21 and cover portion 22. The bag can be fabricated from various lightweight plastics which are liquid impermeable such as polyethylene, polypropylene, polyvinylchloride, polymethylmethacrylate, and the like. Preferably, however, the bag should also be impermeable to oxygen. Suitable bags are made up of laminates of aluminum or other lightweight metal and a plastic such as polyethylene, polyvinylchloride, and the like. The protected compartment is constructed to withstand shock which may be encountered during transit. Since the anodes are relatively delicate, such protection is essential. Preferably, the compartment is made up of foamed polystyrene, foamed polyurethanes, foamed polyepoxide resins, foamed phenol-formaldehyde resins, foamed urea-formaldehyde resins or blends of such materials. such materials are light in weight but yet possess high structural strength.

A battery made up of a plurality of cell modules employing the replaceable anodes is illustrated in FIG. 3. The battery comprises casing 30, foam insert 31 to accommodate any shock, fixed end plate 32, ribbed movable end plate 33, a plurality of cell modules 34, a plurality of inter-cell spacers 35 which are adjacent to the end plates and between each two cell modules. The inter-cell spacers allow for the necessary flow of air or oxygen to depolarize the cells. The plurality of cells are electrically connected in parallel by interconnecting negative leads 36 with positive leads 37. The electrical leads are then taken to and through the battery cover at negative contact 38 and the positive contact, not shown. Cover 40 retained on casing 30 by clamp 41 completes the enclosure of the battery.

As seen in the cutaway portion of FIG. 3, each individual cell module comprises an anode 2 air depolarized cathode 3 with a ion-conductive electrolyte impregnated in anode separator 4 separating the anode and cathode. In the embodiment shown, anode 2 comprises a porous zinc body around a conductive screen, not shown. The cathode is made up of a continuous hydrophobic membrane, a conductive support screen and an electro-catalyst pressed into and around the support screen. The hydrophobic membrane is polytetrafluoroethylene and the electro-catalyst is a uniform mixture of platinum bonded with polytetrafluoroethylene particles. The catalyst and bonding agent are present at a weight ratio of 10 parts to 3 parts. The electrolyte is a solution of aqueous (31 percent) potassium hydroxide.

After the battery is discharged, the cells are reactivated by removing the cover and rotating knob 42 counter-clockwise to release the pressure on the cell modules. The spent anodes are then removed from the envelope cathodes. The protected compartment is then opened and one by one the bagged anodes are opened and an anode inserted into each envelope cathode. Since the electrolyte is contained within the anode, it is not necessary to replenish the corrosive electrolyte. At most, it is only necessary to add minor amounts of water. After all of the anodes are inserted in the battery, knob 42 is turned clockwise to again apply pressure to the cell modules through the end plates and the cover replaced. The cell is now completely activated and again ready for operation.

As apparent, the entire recharging operation is extremely simple. By having the anode containing the electrolyte in the plastic bags, the troublesome operation of replenishing the electrolyte is avoided. Surprisingly, by having the anodes in the plastic bags which in turn are packaged in a protective compartment, the anodes can be stored for long periods of time without showing any signs of deleterious effects. The lengthy shelf life is extremely valuable in both military and civilian applications.

The various components of the metal/air or metal/oxygen battery are described fully in the aforesaid commonly assigned Oswin co-pending application Ser. No. 533,516. Briefly, however, the cathodes employed comprise a hydrophobic membrane which is in contact with a conductive metal support screen or mesh and a catalytic layer. The membrane which is to be used can be any material which is hydrophobic and permits the passage of gas, but precludes the flow of aqueous materials. Exemplary materials are the polymers of fluorinated hydrocarbons such as polytetrafluoroethylene, polytrifluoroethylene, polyvinylfluoride, polyvinylidenefluoride, the hydrophobic co-polymers of two or more of the above materials or co-polymers of such materials with acrylonitrile, methacrylate, polyethylene, and the like. The polymers normally will have a porosity of from about 15 to 85 percent and a uniform pore size distribution of from about 0.01 to about 100 microns and a thickness of about 0.5 to 10 mils. The catalyst used to coat the hydrophobic polymer are the pure elements, alloys, oxides, or mixtures thereof which are effective in promoting an electrochemical reaction. More specifically, operable materials include the elements, alloys, oxides, or mixtures of Group I-B, II-B, IV, V, VI, VII and VIII metals of the Mendeleev's Periodic Table. The metal support screen can be any material which conducts an electrical current and will withstand the corrosive environment of the battery. Such materials include nickel, zirconium, titanium, and tungsten screens, expanded meshes, or the like. Moreover, it is possible to apply a hydrophilic polymer or other suitable hydrophilic material such as paper over the catalytic layer which will be in contact with the electrolyte of the battery when in operation.

The anodes which are to be used herein can be any conventional solid electro-conductor employed in a metal/air or metal/oxygen cell such as metals, metalloids, alloys, and heavy metal salts. It is only essential that the material selected be chemically reactive with a compatible electrolyte and be more electro-positive than oxygen. Such materials include lead, zinc, iron, cadmium, aluminum, and magnesium. From the standpoint of cost, capacity, and convenience, zinc is the preferred material. Although the anode can be in the form of a solid or substantially solid metal sheet, it is preferred that the anode be porous. Porous anodes can be made, for example, by sintering select metal powders.

The cells will operate on conventional electrolytes including the alkali materials such as sodium hydroxide, potassium hydroxide, mixtures of potassium or rubidium hydroxide and the like. Acid electrolytes including sulfuric acid, phosphoric acid, and hydrochloric acid can be employed. As is apparent, depending upon the particular electrolyte used, different anode materials can be selected. It is also feasible and at times desirable to employ an electrolyte which is trapped in a suitable matrix such as those made up of hydrophilic polymers, ceramic materials, and the like.

It should be appreciated that the instant invention is not to be construed as being limited by the illustrative embodiment. It is possible to produce still other embodiments without departing from the inventive concept herein disclosed. Such embodiments are within the ability of one skilled in the art.

It is claimed:

1. As a new article, an assembly including select elements for use with metal/air depolarized cells, said cells comprising as essential elements an air depolarized cathode, a consumable metal anode, a hydrophilic separator, and a material capable of functioning as an electrolyte in aqueous solution, said assembly including from said essential elements only said anode, said hydrophilic separator, and said material, said hydrophilic separator disposed around and in contact with said anode, at least one of said separator and anode including a quantity of said material capable of functioning as an electrolyte in aqueous solution, said quantity of said material in said separator and anode constituting the sole source of electrolyte material and being sufficient to operate the metal/air depolarized cell substantially over the life of said anode when disposed in said cell without requiring additional electrolyte material or any other material with the exception of water, and a substantially liquid and substantially gas impermeable envelope enclosing said assembly.

2. The article of claim 1 wherein the electrolyte material is an alkaline material.

3. The article of claim 2 wherein the alkaline material is potassium hydroxide.

4. The article of claim 1 wherein the electrolyte material is an acidic material.

5. The article of claim 1 wherein said anode comprises a solid metal body.

6. The article of claim 5 wherein the metal is zinc.

7. The article of claim 5 wherein the substantially liquid and substantially gas impermeable envelope is made of a laminate of a thin metal film and a plastic.

8. The article of claim 1 wherein said anode comprises a porous metal body.

9. The article of claim 8 wherein the metal is zinc.

10. The article of claim 8 wherein the substantially liquid and substantially gas impermeable envelope is made of a laminate of a thin metal film and a plastic.

11. The article of claim 1 wherein the metal is zinc.

12. The article of claim 1 wherein the substantially liquid and substantially gas impermeable envelope is made of polyethylene.

13. The article of claim 1 wherein the substantially liquid and substantially gas impermeable envelope is made of a laminate of a thin metal film and a plastic.

14. An article of manufacture comprising a protected compartment comprising a receptacle portion and a cover portion, said receptacle portion and cover portion being constructed and arranged to receive and snugly hold a plurality of the articles of claim 1.

15. A method of recharging and discharging a mechanically rechargeable cell, said cell containing a nonconsumable cathode comprising a hydrophobic polymer member with a catalytic layer at one surface of said member and a consumable metal anode, said anode and catalytic layer of said cathode being separated by an electrolyte, said method comprising the steps of (1) removing a spent anode from said cell; (2) removing a fresh anode impregnated with a quantity of material capable of functioning as an electrolyte in aqueous solution sufficient for the operation of a metal/air depolarized cell when disposed therein without requiring additional material from a substantially liquid and substantially gas impermeable package; (3) inserting said fresh anode into the area of said cell exposed by the removal of said spent anode; and (4) discharging said cell, the electrolyte in said anode constituting the sole source of electrolyte during said discharging of said cell.

16. The method of claim 15 including the step of adding water after the anode is inserted in step (3).

17. The method of claim 16 wherein the consumable metal anode is porous zinc.

18. The method of claim 17 including the step of removing individually packaged anodes from a protected compartment.

19. The method of claim 17 wherein the said material is potassium hydroxide.

20. The method of claim 17 wherein the anode includes a hydrophilic separator, with said material being impregnated in said separator and porous zinc.

References Cited

UNITED STATES PATENTS

| | | | |
|---|---|---|---|
| 1,588,608 | 6/1926 | Oppenheim | 136—86 |
| 2,635,128 | 4/1953 | Arbogast | 136—132 |
| 2,737,503 | 3/1956 | Sprague et al. | |
| 2,814,382 | 11/1957 | Lassiter. | |
| 2,856,449 | 10/1958 | Coler | 136—132 X |
| 2,995,614 | 8/1961 | Krueger | 136—132 X |
| 3,146,929 | 9/1964 | Keim. | |
| 3,346,137 | 10/1967 | Ricci. | |
| 3,363,957 | 1/1968 | Basch. | |
| 3,378,406 | 4/1968 | Rosansky | 136—86 |
| 3,436,270 | 4/1969 | Oswin et al. | 136—86 |

FOREIGN PATENTS

| | | |
|---|---|---|
| 18,398 | 1910 | Great Britain. |
| 25,516 | 1910 | Great Britain. |

ALLEN B. CURTIS, Primary Examiner

U.S. Cl. X.R.

136—176; 206—46